United States Patent Office.

GEORGE W. SCOLLAY, OF ST. LOUIS, MISSOURI.

Letters Patent No. 95,939, dated October 19, 1869; antedated October 5, 1869.

IMPROVEMENT IN PRESERVING DEAD BODIES.

The Schedule referred to in these Letters Patent and making part of the same:

*To all whom it may concern:*

Be it known that I, GEORGE W. SCOLLAY, of the city of St. Louis, in the county of St. Louis, and State of Missouri, at present sojourning in the city, county, and State of New York, have invented certain new and useful Improvements in the Art of Preserving Dead Bodies and Carcasses from Putrefaction—the life-like appearance of the human body, and the fresh, juicy appearance of the animal carcass; and I do hereby declare the following to be such a full, clear, and exact description of my invention as will enable any one skilled in the art to which it appertains to work or practise the same.

The object of this invention is not merely to preserve the body or carcass from putrefaction, as that I have already most thoroughly accomplished, by the introduction of antiseptic gas or gases into the venous or arterial system, substantially in the manner described in the patent heretofore granted to me, to wit, on the 22d day of January, 1867, antedated January 19, 1867, and afterwards reissued on the 16th day of July, 1867. But the object of this invention is to preserve the life-like appearance of the human body, and the fresh, juicy appearance of the flesh of the animal body or carcass, and without making the latter deleterious as food.

The patent above referred to was given to me for preserving the body with antiseptic gas or gases, thrown into the arterial or vascular system, as will more fully appear by reference to the specifications making part of the same.

Since that patent was applied for, experience has fully demonstrated the success of the invention, so far as the preservation of the body from putrefaction is concerned, as the introduction of some of the antiseptic gases, sulphurous-acid gas, for example, into the arterial and venous systems, thoroughly annihilates the tendency to putrify. Bodies embalmed in this way, will keep until the tissues dry up or mummify.

The use of these antiseptic gases, however, though they thoroughly preserve the body against putrescence, are, nevertheless, imperfect in their effect upon the body when used alone or in combination with each other, for although they render the muscles and tissues of the body flexible, as in life, and restore the life-like color, they do not make and maintain the color of the human body uniform, nor do they maintain the juicy and fresh appearance of the flesh of the animal carcass so perfectly as is desirable.

Now, I have discovered, in the course of my experiments upon this subject, that there is a variety of gases and vapors which, when thrown into the arterial and vascular system of the body or carcass, after death, will restore the life-like color of the nervous blood, and consequently the tissues and substances of the body or carcass, and that this is especially true of that class of gases which are combustible or will support combustion. I have also discovered, that by uniting these gases or vapors, which may or may not be antiseptic, with gases that are highly antiseptic in or on the body, in combination with a neutral salt, a saline, or alkaline influence applied to the body or carcass, I can not only preserve the body, but can also preserve, uniformly, the life-like color of the entire human body, and the fresh, juicy appearance of the flesh of the animal carcass.

In the practice of my invention, to accomplish the objects aforesaid, I proceed as follows; that is to say—

I make, first, an alkaline or saline solution, consisting of water, muriate of ammonia, and sulphite of soda or potash, in the proportion of about ten ounces of water to three of sulphite of soda or potash, and one drachm of muriate of ammonia, adding about half an ounce of soda, giving the solution an alkaline predominance. I then make a combination, in a suitable retort, of sugar and sulphuric acid, in the proportion of about three fluidounces of the acid to one-half ounce of sugar. I then take about twenty ounces of the alkaline solution, and put into a suitable vessel or retort, supplied with a small flexible tube, fitted with a beak of hard rubber, non-corrosive metal, or ivory. This retort, containing the alkaline solution, I then connect to the retort containing the mixture of sulphuric acid and sugar. I then make a small incision in the tibial, radial, or any convenient artery, and insert the beak of the tube. I then put a lamp under the retort containing the sugar and acid, and generate the gases in combination, sufficient to drive the alkaline solution through the tube, (the end of which must be immersed to the bottom of the solution,) into the arterial and venous system, and afterward allow the gas or gases to follow the fluid into the body, until the sugar and acid have been depleted of their gases, or until sufficient of the gases has entered the vascular and arterial system to neutralize the alkaline excess of the solution, and to insure the preservation of the body.

The result of this process will be, first, a complete preservation of the body against putrefaction; and, second, the obtaining, or restoring and maintaining, the uniform life-like color and juicy appearance of the body and flesh, and its soft, flexible consistency for comparatively a long period of time, or until the fluids of the body have evaporated, and the tissues become hard and mummified.

The fluid or alkaline solution may, of course, be thrown into the body with a syringe, and the gas or gases introduced afterward, either directly from the retort, as fast as they are generated, or in any other convenient way which may best answer the convenience of the practitioner; and there are various other substances which may be used as a substitute for those above described. Thus, for example, the gas may be made of yellow prussiate of potash, sulphuric, phenic, or carbolic acid and charcoal, in the proportion of about one part of potash to eight or ten of the sulphuric acid, and from one to two drachms of phenic or carbolic acid, by weight, adding two or three drachms of charcoal. The mixture, being put in a retort, and heat applied the same as before, to generate the gas or gases, which are then used in combination with the same saline or alkaline solution, introduced in the same way as above described, or with any solution made of the neutral and soluble salts, or a solution may be made of sugar-water, phenic acid and soda, or potash, in the proportion of sugar, one ounce; soda or potash, one ounce; phenic acid, from one to two drachms, in about ten ounces of water. This solution may be used in the place of the above-described alkaline solution, in combination with the gas or gases made from either of the aforementioned formulas, and introduced as before. The proportion of the formulas, however, should be increased for large bodies, those given being for children or small carcases.

Now, it will be seen that the gases generated and thrown into the veins and arteries, as above described, are acidulous, and that the fluids or solutions with which the arterial and venous system are injected are saline or alkaline, so that when the two are united in the body the one neutralizes the other, and forms a salt; that is to say, the chemical affinities of the acids are fixed by the solutions, without destroying their antiseptic influence upon the tissues of the body or carcass. Here the different gases are generated together, and pass into the body together, but they may be generated separately, and separately introduced into the body, and they may be made of an almost infinite variety of substances. And so, too, with the solution. It may be made of many different substances, which may be antiseptic in themselves, or they may or may not be antiseptic in their influence upon the tissues of the body when used alone, or the solution may be made in parts, and in parts introduced and united in the body with themselves and with the gases.

It is difficult to explain the chemical action and re-actions which take place in these combinations. The chemistry of the body is very delicate and obscure; the only thing I am certain of, is the effect. I know the body or carcass is preserved in its life-like and juicy appearance when treated as above described; and I know that that preservation is due to the introduction of an antiseptic gas, with another gas, which restores the life-like color of the venous blood, whether the latter gas be antiseptic or not, the two gases being applied to or introduced in the body or carcass when under an alkaline or saline influence, whether that influence is the result of a solution thrown into the arterial or vascular system, or whether it be otherwise incorporated with the tissues of the body or carcass, and whether it be antiseptic or not, provided the solution has the influence above described, and is so applied as to bring it within reach of the gas or gases.

The body may be subjected to the influence of the solution after the gases have been introduced, with the same effect, so far as the preservation of the body is concerned, as though the solution were applied first. The point is to bring the two influences together in the body as completely as possible, in whichever way they may be applied, but the uniformity of color in the corpse is best preserved by applying the solution first.

Having now described the nature and extent of my improvement in the art of preserving dead bodies and carcasses,

I claim as new herein, and desire to secure by Letters Patent—

1. Preserving the body or carcass, by combining, in the arterial or vascular system thereof, the antiseptic, or preserving qualities or influence of a fluid or fluids and a gas or gases, so made, mixed, and compounded as to exert an antiseptic influence upon the body, when united therein, whether the gas or gases and fluid or fluids are antiseptic in themselves or not, or whether they would exert an antiseptic influence or not upon the body, when separately applied thereto.

2. Restoring and preserving the life-like color of the venous blood, and the consequent life-like appearance of the corpse or flesh of the carcass, by means of a combination of gases which are antiseptic and color-restoring in their influence, when united in the vascular and arterial system of the body, substantially as described.

3. Subjecting the body or carcass to an antiseptic influence, in the form of a fluid, introduced into the arterial and vascular system, and to an antiseptic influence in the form of a gas, introduced into the blood and tissues either through the lungs, the pores of the skin, or through the arterial and venous system, so as to cause the two influences to combine in the body, for the purpose of preserving the same, substantially as described.

GEORGE W. SCOLLAY.

Witnesses:
PETER D. KENNY,
AMOS BROADNAX.